United States Patent [19]
Levine et al.

[11] Patent Number: 5,862,371
[45] Date of Patent: Jan. 19, 1999

[54] METHOD AND SYSTEM FOR INSTRUCTION TRACE RECONSTRUCTION UTILIZING PERFORMANCE MONITOR OUTPUTS AND BUS MONITORING

[75] Inventors: Frank Eliot Levine; William John Starke; Edward Hugh Welbon, all of Austin, Tex.; Jack Chris Randolph, Rochester, Minn.

[73] Assignee: International Business Machines Corporation, Armonk, N.Y.

[21] Appl. No.: 758,198

[22] Filed: Nov. 25, 1996

[51] Int. Cl.⁶ .......................................................... G06F 9/00
[52] U.S. Cl. ........................................... 395/569; 395/580
[58] Field of Search ..................................... 395/568, 569, 395/183.21, 183.14, 500, 580, 581, 582, 583, 584, 585, 586, 587, 588, 589

[56] References Cited

U.S. PATENT DOCUMENTS

| | | | |
|---|---|---|---|
| 4,241,416 | 12/1980 | Tarczy-Hornoch | 395/184.01 |
| 4,598,364 | 7/1986 | Gum et al. | 395/183.14 |
| 5,136,590 | 8/1992 | Polstra et al. | 395/183.05 |
| 5,289,587 | 2/1994 | Razban | 395/500 |
| 5,321,828 | 6/1994 | Phillips et al. | 395/500 |
| 5,359,608 | 10/1994 | Belz et al. | 395/183.14 |
| 5,446,876 | 8/1995 | Levine et al. | 395/184.01 |
| 5,491,793 | 2/1996 | Somasundaram et al. | 395/183.21 |
| 5,742,804 | 4/1998 | Yeh et al. | 395/584 |

*Primary Examiner*—Krisna Lim
*Assistant Examiner*—Kenneth R. Coulter
*Attorney, Agent, or Firm*—Casimer K. Salys; Andrew J. Dillon

[57] ABSTRACT

A method and system for instruction trace reconstruction utilizing performance monitor outputs and bus monitoring. Performance projections for processor systems and memory subsystems are important for a correct understanding of work loads within the system. An instruction trace is generally utilized to determine distribution of instructions, identification of register dependencies, branch path analyzes and timing. One well known technique for reconstructing an instruction trace can be accomplished by monitoring bus traffic to determine instruction addresses, data addresses and data during the trace, if the initial architectural state of the system is known. The difficulty in reconstructing an instruction trace from monitored bus traffic can be decreased substantially if more definitive information regarding the actual instruction sequence can be obtained. To this end, an internal performance monitor within the processor system is utilized to generate an output each processor clock cycle which is indicative of the exact number of instructions which were executed during that clock cycle, an indication of whether or not a branch instruction was taken or not taken, an offset for each interrupt vector which has been taken, the number of data cache misses, the number of instruction cache misses, the number of store conditional instructions which were executed and the number of store conditional instructions which failed. This information, in combination with monitored bus traffic may be utilized to efficiently and accurately reconstruct an instruction trace without adversely affecting performance of the system under test.

10 Claims, 5 Drawing Sheets

METHOD AND SYSTEM FOR INSTRUCTION TRACE RECONSTRUCTION UTILIZING PERFORMANCE MONITOR OUTPUTS AND BUS MONITORING

CROSS-REFERENCE TO RELATED APPLICATIONS

The present application is related to co-pending applications Ser. No. 08/758,197 and Ser. No. 08/758,196 which are assigned to the assignee herein named and which are filed of even date herewith. The content of those co-pending applications are incorporated herein by reference thereto.

BACKGROUND OF THE INVENTION

1. Technical Field

The present invention relates in general to an improved method and system for instruction trace reconstruction in a data processing system and in particular to an improved method and system for instruction trace reconstruction utilizing an internal performance monitor. Still more particularly, the present invention relates to an improved method and system for instruction trace reconstruction in a data processing system utilizing selected outputs from a performance monitor system which permit an efficient reconstruction of an instruction trace.

2. Description of the Related Art

Data processing systems in recent years have been improved on a continuous and highly accelerated basis. Whether the improvements to such data processing systems are software related or hardware related, it is important for a developer to have some expectation of the performance of a new system under construction before that system is actually completely developed. In order to make this evaluation of an expected new system or changes to a current system, various techniques are known. Many different approaches have been utilized within the computer industry in order to understand and characterize those parameters which can be utilized to predict the value associated with a proposed set of changes. One particular approach is a full system software simulation of the entire system, including all of the system devices and the system software, accesses to data stored within a direct access storage device. A complete system simulation approach requires an extremely significant investment in software and has the drawback that the time required to run such a simulation is extremely long. Another approach utilized by developers is an effort to develop accurate, "representative instruction traces" which permit the use of a simplified system model in order to predict the performance of the new system.

Performance projections for processors and memory subsystems are critically dependent upon a correct understanding of the workloads which are imposed on such systems. In order to accurately predict the performance of a proposed system and assist in selecting among the various designed trade-offs, it is necessary to collect instruction streams (i.e., "traces") that statistically represent actual workloads. By utilizing traces which represent a fixed workload as input to a system model that allows variations on some hardware parameter, such as the number of processors, developers hope to be able to predict performance for that workload with a different number of processors.

One known software approach to developing an instruction and address trace is the so-called "single-step" mechanism, where a single step interrupt handler is executed immediately before or after an instruction is executed. The interrupt handler may then decode the instruction and write the pertinent information regarding that instruction to a trace buffer. The trace buffer may be provided within system memory or may be in a special hardware buffer. The hardware buffer approach is often implemented by having the interrupt handler write the relevant information at a specific address on the processor bus which is then captured by a bus monitor looking for data at that address.

Another known variation is the execution of software in a simulation model. The simulation model works well on so-called RISC systems such as the RISC System/6000 machine running AIX or other suitable software for constructing application traces. Such an approach does have several drawbacks if it is utilized in an attempt to capture kernel traces as well. In a typical implementation that supports the capturing of kernel traces, the code is updated or "instrumented" to provide relevant information as part of the tracing process. When software approaches like these are utilized that include kernel activities, it is very important to provide some type of compensation to reflect the fact that the system timings have been perturbed. For example, there may be a much larger number of timer ticks executed than would normally be utilized and thus, the ratio of external interrupts to code being executed is similarly affected. Compensating for such timing changes may be fairly reasonable for benchmarks that are not utilizing many kernel services and/or external interrupts.

Instruction and address traces which are constructed via software instrumentation techniques can be very invasive and often severely affect the system under test. Traces produced in this manner are very time consuming, but they provide information required for fairly simple application (problem state) intensive benchmarks, where the kernel accesses are negligible. However, traces developed under conditions where the software is instrumented, are not typically considered suitably representative to characterize extremely dynamic work loads which access kernel services, such as those found in On-Line Transaction Processing (OLTP) work loads. Full system simulation approaches avoid these problems, but require an extreme investment in both software and in the time the simulation requires to run.

One technique for providing traces utilizes the processor to externalize information about what is going on inside the processor via signals or pins which can be monitored from outside the processor. A simple instruction trace can be externalized in a very straightforward manner by simply putting out the actual instruction being executed on every processor cycle. An operand address trace can be externalized by putting out the operand address on such pins. By understanding the content of the processor's internal buffers, encoded information may then be utilized to identify the operand addresses. That is, for example, signals can be utilized to identify a hit or a miss in the processor's cache or translation lookaside buffer (TLB). In case of a hit, encoded information, such as an index into the internal buffer, can be utilized to capture and construct virtual address traces. In the event of a miss, more cycles are available to give the actual address (either real or virtual) of the operand of the instructions. Both of these approaches have the drawback of requiring many pins and, as a practical matter, may be difficult to support at full speed. The processor support required may be difficult to implement due to out-of-order execution and superscalar designs with multiple instructions being dispatched and completing on a single cycle. Capturing of the data is also difficult due to the increasing speeds of modern processors. In order to actually support this approach, the speed of the processor and/or the system may have to be reduced and the processor may have to run in a single instruction issue mode.

Thus, while it is known that a representative instruction trace may be provided for a system under test by attempting the reconstruction of an actual instruction sequence utilizing instruction and address data monitored on the system bus, the problem of determining the actual instruction trace efficiently without requiring a large number of output pins is also well known. Consequently, those having skill in the art will appreciate that a need exists for an improved method and system for instruction trace reconstruction which utilizes a limited number of processor system output pins.

SUMMARY OF THE INVENTION

It is therefore one object of the present invention to provide an improved method and system for instruction trace reconstruction in a data processing system.

It is another object of the present invention to provide an improved method and system for instruction trace reconstruction utilizing a performance monitor.

It is yet another object of the present invention to provide an improved method and system for instruction trace reconstruction in a data processing system utilizing a limited number of performance monitor output pins.

The foregoing objects are achieved as is now described. A method and system are disclosed for instruction trace reconstruction utilizing performance monitor output pins and bus monitoring. Performance projections for processor systems and memory subsystems are important for a correct understanding of work loads within the system. An instruction trace is generally utilized to determine distribution of instructions, identification of register dependencies, branch path analyses and timing. One well known technique for reconstructing an instruction trace can be accomplished by monitoring bus traffic to determine instruction addresses, data addresses and data during the trace, if the initial architectural state of the system is known. The difficulty in reconstructing an instruction trace from monitored bus traffic can be decreased substantially if more definitive information regarding the actual instruction sequence can be obtained. To this end, an internal performance monitor within the processor system is utilized to generate an output each processor clock cycle which is indicative of the exact number of instructions which were executed during that clock cycle, an indication of whether or not a branch instruction was taken or not taken, an offset for each interrupt vector which has been taken, the number of data cache misses, the number of instruction cache misses, the number of store conditional instructions which were executed and the number of store conditional instructions which failed. This information, in combination with monitored bus traffic may be utilized to efficiently and accurately reconstruct an instruction trace without adversely affecting performance of the system under test.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
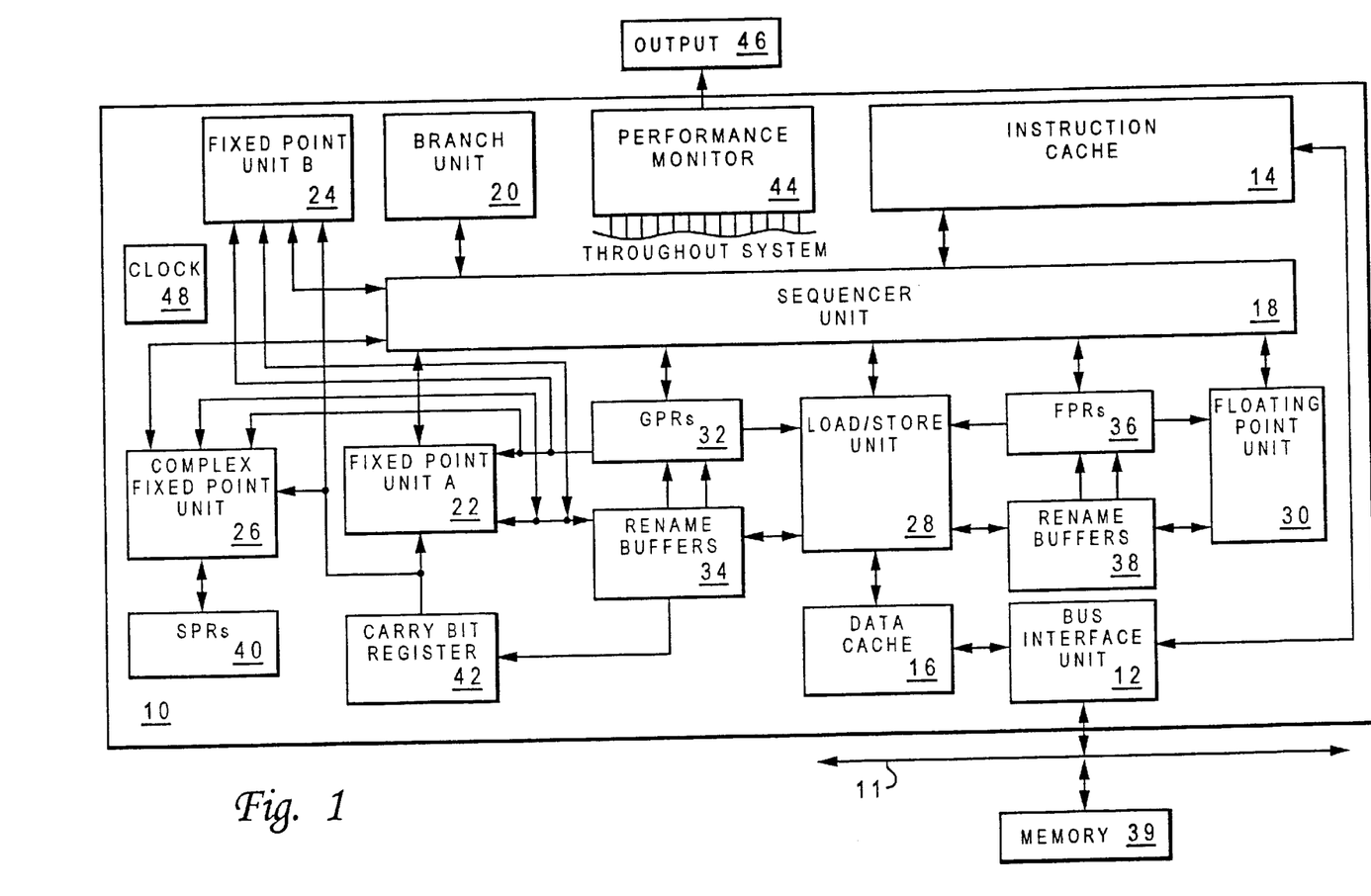
FIG. 1 is a high level block diagram of a processor system which may be utilized to implement the method and system of the present invention.

FIG. 1 is a block diagram of a processor 10 system for processing information according to the illustrative embodiment. In the illustrative embodiment, processor 10 is a single integrated circuit superscalar microprocessor. Accordingly, as discussed further hereinbelow, processor 10 includes various processor assets including execution units, registers, buffers, memories, and other sections, all of which are formed by integrated circuitry. Also, in the illustrative embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the illustrative embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction. LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 16. If one or more of the sequence of instructions is not stored in instruction cache 14, then instruction cache 14 inputs (through BIU 12 and system bus 11) such instructions from system memory 39 connected to system bus 11.

In response to the instructions input from instruction 14, sequencer unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining". In a significant aspect of the illustrative embodiment, an instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28, and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

Also depicted within processor 10 is performance monitor 44. Performance monitor 44 is utilized, in a manner well known to those having ordinary skill in the art, to optimize the performance of a data processing system. Timing data from the performance monitor may be utilized to optimize programs. In addition, performance monitor 44 may be utilized to gather data about access times from system caches and main memories and, monitor performance of the various units within processor 10.

In a common utilization of performance monitor 44, performance monitor 44 is coupled to FXUA 22, FXUB 24, CFXU 26, LSU 28, BIU 12, branch unit 20, instruction cache 14, data cache 26, sequencer unit 18, FPU 30, and various registers within processor 10 system. Various outputs generated within performance monitor 44 are coupled to output 46, commonly referred to as a "debug" port.

For a further discussion of the use of performance monitoring within a superscalar data processing system, see U.S. Pat. No. 5,557,548, issued to certain of the inventors herein named and assigned to the assignee of the present application.

Finally, clock 48 is depicted schematically within FIG. 1. Clock 48 is utilized to provide processor clock cycles to the various units within processor 10 system.

Figure 2:
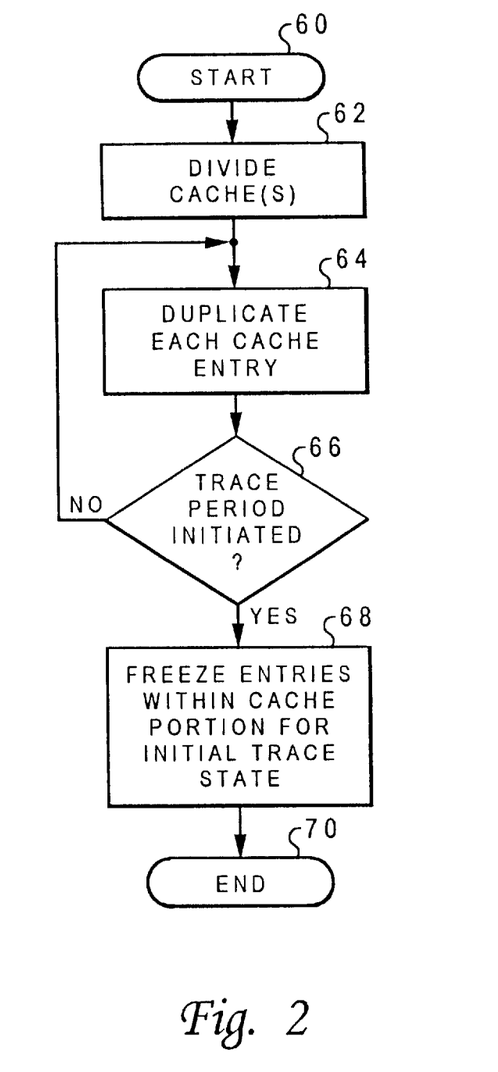
FIG. 2 is a high level logic flow chart illustrating a method for determining an initial state of a cache memory within the processor system of FIG. 1 in accordance with the method and system of the present invention.

Referring to FIG. 2, there is depicted a high-level flow chart which illustrates one method for determining an initial state of a cache memory within processor 10 system of FIG. 1. As depicted, this process begins at block 60 thereafter passes to block 62. Block 62 depicts the dividing of a cache into two portions. For purposes of illustration, both instruction cache 14 and data cache 16 may be so divided. The utilization of this technique provides an indication of the initial state of a cache upon the initiation of an instruction trace, without requiring the time necessary to invalidate an entire cache and refill that cache with appropriate data at the time of the instruction Next, the process passes to block 64. Block 64 illustrates the duplication of each new cache entry within the system during processing of instructions in order to replace invalidated entries in each half, such that upon initiation of an instruction trace, the cache halves are already filled with valid data. That is, in a manner which will be illustrated in greater detail herein, each new cache entry made is duplicated within each portion of the divided cache.

Next, the process passes to block 66. Block 66 illustrates a determination of whether or not the trace period has been initiated and if not, the process returns to block 64, in an iterative fashion, to continue duplicating each cache entry.

Still referring to block 66, in the event the trace period has been initiated, the process passes to block 68. Block 68 depicts the freezing of the entries within one cache portion in order to accurately determine the initial trace state of that cache. The process then passes to block 70 and terminates.

Upon reference to the foregoing, those skilled in the art will appreciate that by dividing one or more caches in half, prior to initiation of an instruction trace, and then refilling both halves before initiating an instruction trace, in the manner depicted within FIG. 2, the perturbing effect of invalidating the caches during an instruction trace is avoided. This may be accomplished by utilizing a system in which the system is designed to operate in a mode wherein only one half of the cache is utilized. In such a case, a simple enhancement may be provided, for internal use, which supports a signal which writes the same data, including directory data, to the normally "unused" portion of the cache. Thereafter, when that signal changes states, data will no longer be written to that portion of the cache, thus preserving the initial state of the cache. This data may then be retrieved via an appropriate interface.

Figure 3:
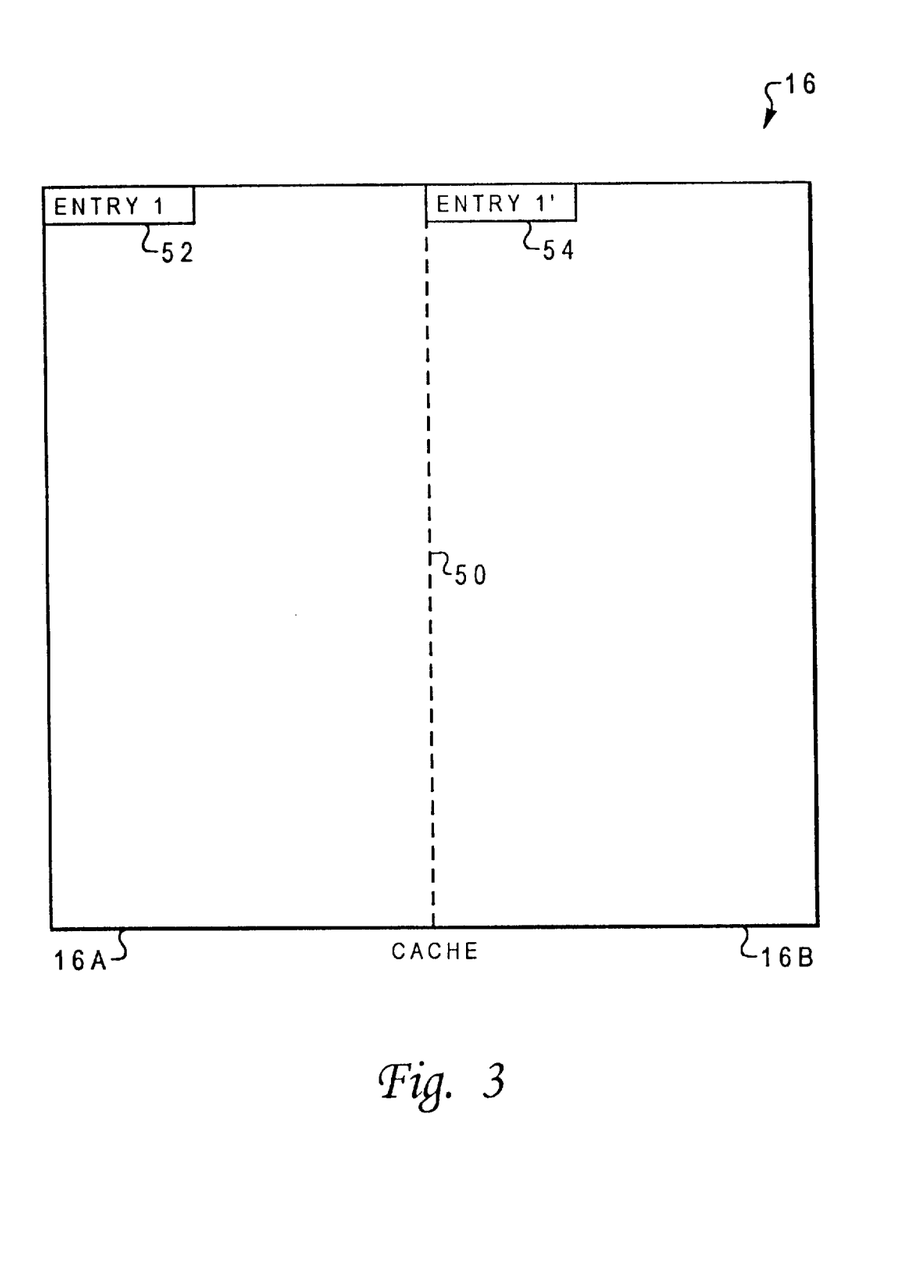
FIG. 3 is a schematic representation of a divided cache memory which may be utilized to implement the method and system of the present invention.

This process of dividing the cache is schematically depicted within FIG. 3 which illustrates a digital cache memory which may be utilized to implement the method and system of the present invention. As depicted, cache 16 is divided into a first portion, 16A and a second portion, 16B by means of a partition 50 and both halves of the cache are either cleared or invalidated. Thereafter, each time an entry, such as entry 52, is written into cache portion 16A, an identical entry, entry 54, is written into cache portion 16B. Thus, after a sufficient period of operation, cache 16B will in effect be a "shadow" of cache 16A. Thereafter, upon the initiation of an instruction trace, the duplication of cache entries is terminated and the content of cache portion 16B will represent an accurate depiction of the initial state of the cache which may then be utilized to reconstruct an instruction trace.

Figure 4A:
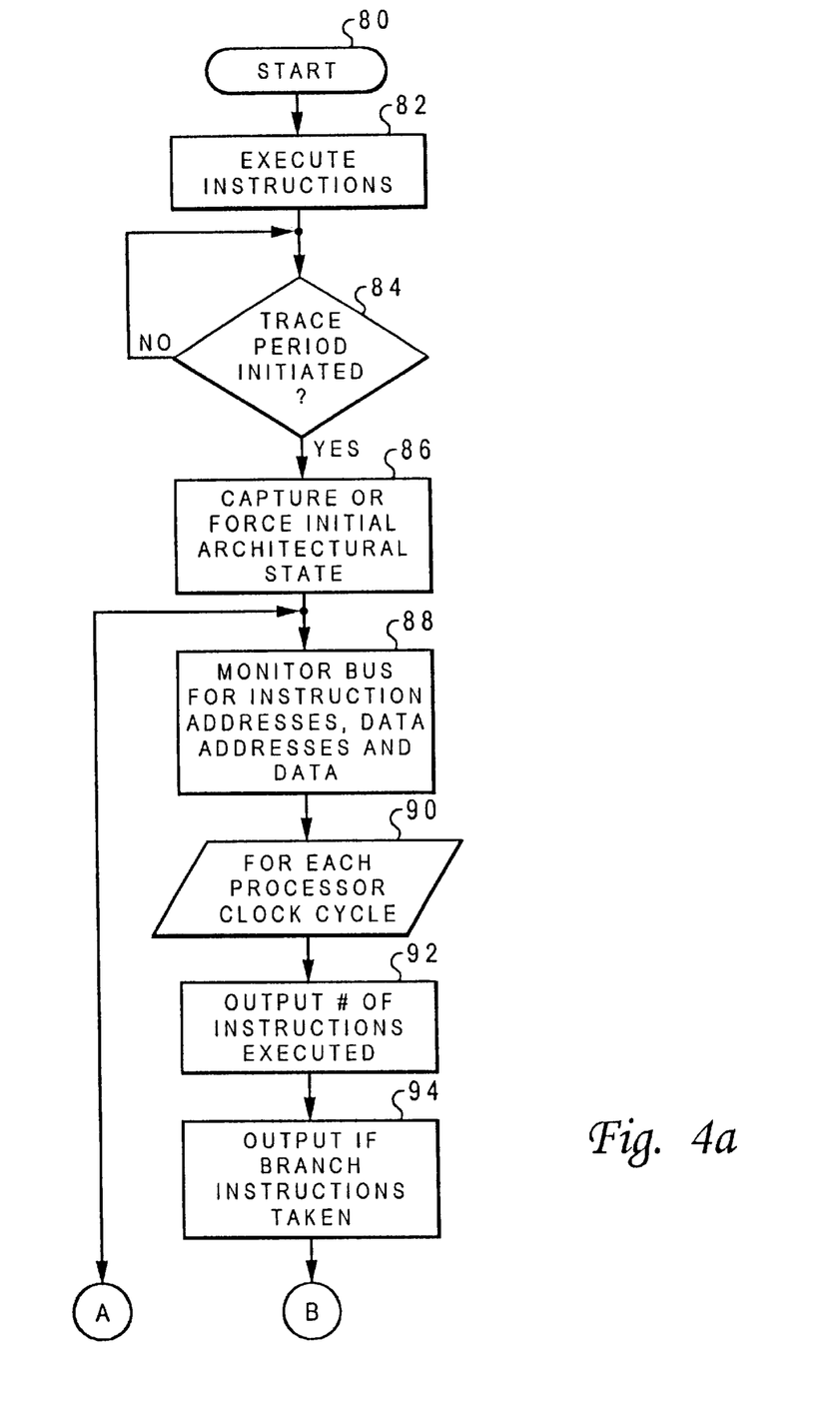
FIGS. 4A and 4B together form a high level logic flow chart illustrating a method for instruction trace reconstruction in accordance with the method of the present invention.
Figure 4B:
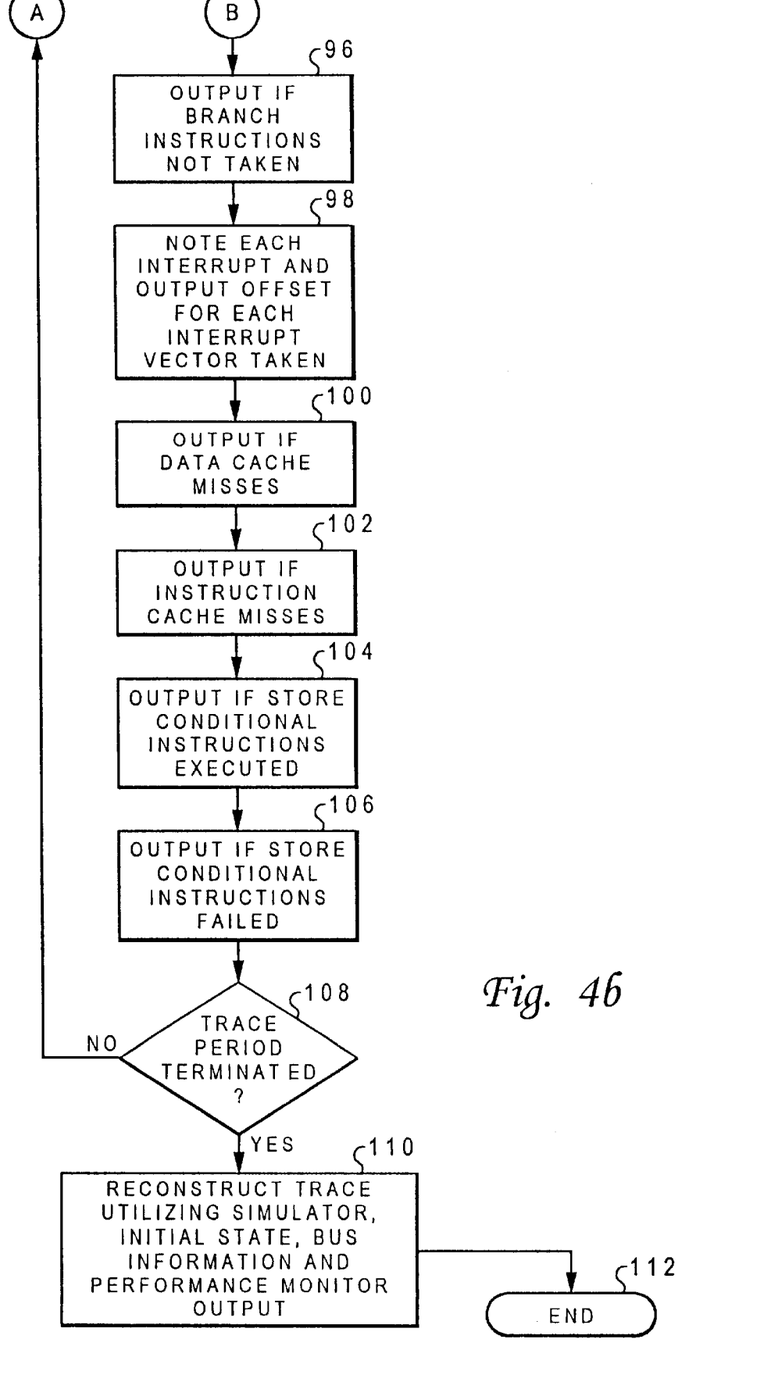

Finally, referring to FIGS. 4A and 4B, there is depicted a high level logic flow chart which illustrates a method for instruction trace reconstruction in accordance with the method and system of the present invention. As depicted, this process begins at block 80.

Next, the process passes to block 82. Block 82 illustrates the execution of instructions. It should be noted that during this period of time the content of the cache will be duplicated, as illustrated within FIG. 3.

Next, as depicted in block 84, a determination occurs as to whether or not a trace period has been initiated. If not, the process merely iterates until the trace period initiates.

Still referring to block 84, in the event a trace period has been initiated the process passes to block 86. Block 86 illustrates the forcing or capturing of the initial architectural state. As described above, the initial state for one or more caches within the system may be captured by freezing entries within the duplicate portion of each cache such that the initial state may be captured for future use. Similarly, the content of architected registers and buffers may be copied or invalidated such that the content of those registers and buffers becomes a known initial state.

Next, block 88 illustrates the monitoring of the system bus for instruction addresses, data addresses and data. Thereafter, as illustrated at block 90, a determination is made as to whether or not an external interrupt has occurred. If so, the process passes to block 92 and the occurrence of the external interrupt is noted for use in reconstructing the instruction trace at a later time, as will be explained in greater detail herein.

Next, as depicted at block 90, for each processor clock cycle, the performance monitor outputs a group of signals via a limited number of pins which specify selected activities within the processor system. These output signals indicate, as depicted at block 92, the exact number of instructions executed. Thereafter, block 94 depicts an output from the performance monitor if a branch instruction has been taken. Similarly, block 96 indicates an output from the performance monitor if a branch instruction was not taken.

Next, referring to block 98, each interrupt is noted and an output indicative of the offset for each interrupt vector taken is generated by the performance monitor. Four binary bits may be utilized to represent a large number of offset values, as indicated in Table 1 below.

TABLE 1

| | |
|---|---|
| no interrupt | 0000 |
| System Reset | 0001 |
| Machine Check | 0010 |
| Data Storage | 0011 |
| Inst Storage | 0100 |
| External | 0101 |
| Alignment | 0110 |
| Program | 0111 |
| Floating-point Unavailable | 1000 |
| Decrementer | 1001 |
| System Call | 1100 |
| Trace | 1101 |
| Floating-point assist | 1110 |
| Performance Monitor | 1111 |

Thereafter, as depicted at block 100, an output is generated by the performance monitor if a data cache miss occurs and similarly, block 102 illustrates an output from the performance monitor if an instruction cache miss occurs.

Blocks 104 and 106 depict an output from the performance monitor in response to an occurrence of the execution of a store conditional instruction or the failure of a store conditional instruction, respectively. Finally, referring to block 108, a determination is made as to whether or not the trace period has terminated and if not, the process returns, in an iterative fashion, to block 88 to repeat the process described above.

Still referring to block 108, in the event the trace period has terminated, the process passes to block 110. Block 110 depicts the reconstruction of an instruction trace utilizing an architectural simulator, the initial state of the system, the bus information and the outputs of the performance monitor described. Those having ordinary skill in the art will appreciate that by providing initial state information, all data and instruction and their addresses as they are moved into the processor on the bus, the exact number of instructions executed during each clock cycle, the occurrence of all interrupts, and whether or not branch conditional instructions were taken or not taken, trace reconstruction software may be utilized to accurately and efficiently determine the actual instruction sequence which occurred. However, without the necessity of actually outputting each instruction which has been executed, in a manner utilized in the prior art, the performance monitor of the present invention, outputting the parameters set forth above, can be utilized to efficiently and accurately reconstruct an instruction trace with minimal disruption of the system under test.

While the invention has been particularly shown and described with reference to a preferred embodiment, it will be understood by those skilled in the art that various changes in form and detail may be made therein without departing from the spirit and scope of the invention.

We claim:

1. A method of tracing the execution of a plurality of instructions within a processor system which includes a processor, a main memory, a processor clock and a cache memory, which are interconnected via a bus, said method comprising the steps of:

executing a series of instructions;

initiating an instruction trace;

in response to said initiation of said instruction trace, determining an initial state of said cache memory and monitoring subsequent instruction addresses, data addresses and data on said bus;

during each processor clock cycle, detecting an exact number of instructions executed, an indication of whether each branch instruction is taken or not taken, and providing an output in response to each such detection; and thereafter, reconstructing an instruction trace utilizing said monitor to instruction addresses, data addresses and data, said initial state of said cache memory and said outputs.

2. The method of tracing the execution of a plurality of instructions within a processor system according to claim 1, further including the step of:

during each processor clock cycle, detecting an offset value for each interrupt vector taken and providing an output in response to said detection.

3. The method of tracing the execution of a plurality of instructions within a processor system according to claim 1, further including the step of:

during each processor clock cycle, detecting each store conditional instruction executed and providing an output in response to said detection.

4. The method of tracing the execution of a plurality of instructions within a processor system according to claim 1, further including the step of:

during each processor clock cycle, detecting each store conditional instruction which fails and providing an output in response to said detection.

5. The method of tracing the execution of a plurality of instructions within a processor system according to claim 1, wherein said processor system further includes a plurality of registers and buffers and wherein said method further includes the step of:

copying the content of at least selected ones of said plurality of buffers and registers in response to said initiation of said instruction trace.

6. The system for tracing the execution of a plurality of instructions within a processor system according to claim 1, further including:

means for detecting an offset value for each interrupt vector taken and providing an output in response to said detection.

7. The system for tracing the execution of a plurality of instructions within a processor system according to claim 1, further including:

means for detecting each store conditional instruction executed and providing an output in response to said detection.

8. The system for tracing the execution of a plurality of instructions within a processor system according to claim 1, further including:

means for detecting each store conditional instruction which fails and providing an output in response to said detection.

9. The system for tracing the execution of a plurality of instructions within a processor system according to claim 1, wherein said processor system further includes a plurality of registers and buffers and wherein said system further includes:

means for copying the content of at least selected ones of said plurality of buffers and registers in response to said initiation of said instruction trace.

10. A system for tracing the execution of a plurality of instructions within a processor system which includes a processor, a main memory, a processor clock and a cache memory, which are interconnected via bus, said system comprising:

means for executing a series of instructions;

means for initiating an instruction trace;

means for determining an initial state of said cache memory and monitoring subsequent instruction addresses, data addresses and data on said bus in response to said initiation of said instruction trace;

means for detecting an exact number of instructions executed, an indication of whether each branch instruction is taken or not taken, and providing an output in response to each such detection; and means for thereafter reconstructing an instruction trace utilizing said monitor to instruction addresses, data addresses and data, said initial state of said cache memory and said outputs.

* * * * *

UNITED STATES PATENT AND TRADEMARK OFFICE
CERTIFICATE OF CORRECTION

PATENT NO. : 5,862,371
DATED : Jan. 19, 1999
INVENTOR(S) : Levine et al.

It is certified that error appears in the above-identified patent and that said Letters Patent is hereby corrected as shown below:

In col. 7, line 5, please add --trace.-- after "instruction".

Signed and Sealed this

Seventeenth Day of August, 1999

Q. TODD DICKINSON

Attest:

*Attesting Officer*    *Acting Commissioner of Patents and Trademarks*